Patented Oct. 18, 1949

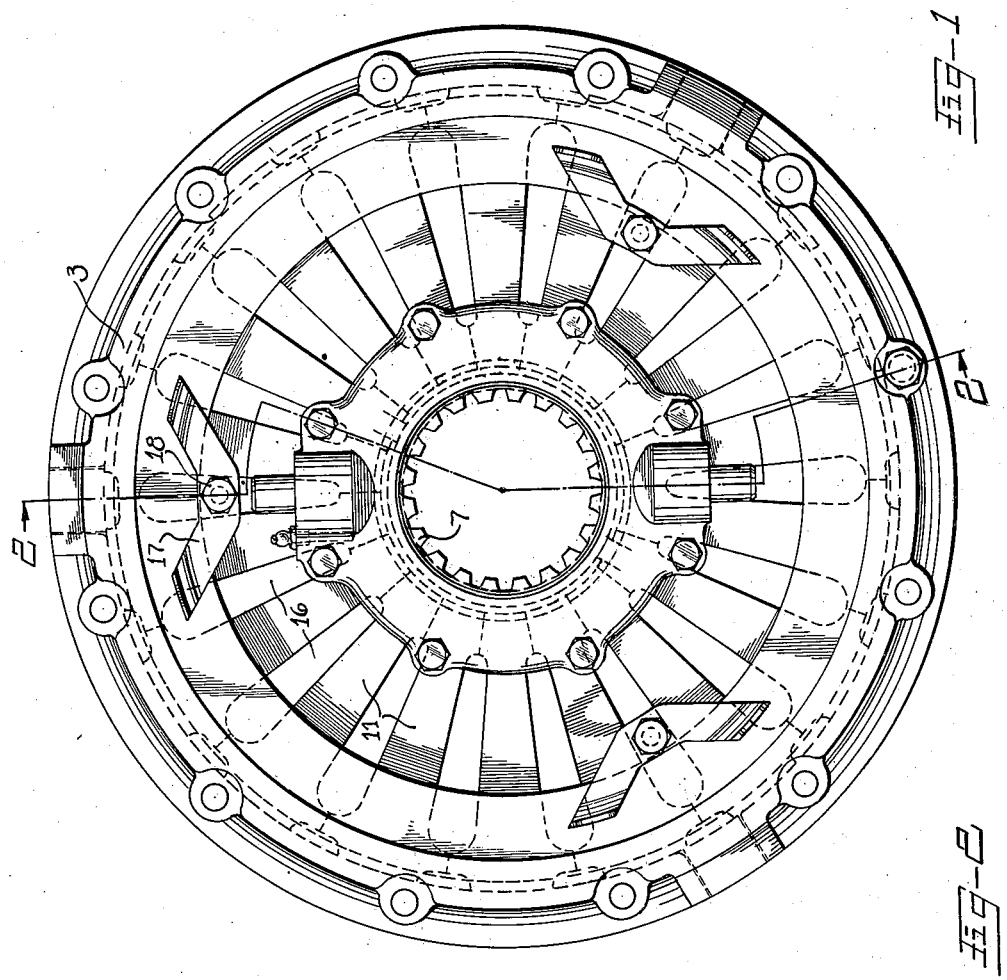
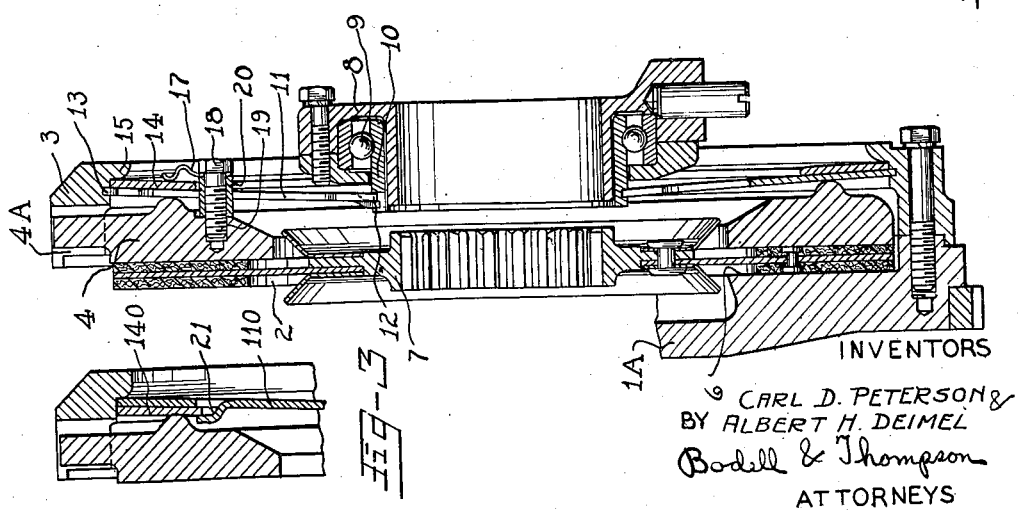

2,485,214

UNITED STATES PATENT OFFICE 2,485,214

AXIALLY ENGAGING OPPOSED CLUTCH

Carl D. Peterson and Albert H. Deimel, Toledo, Ohio; Marion F. Peterson, executrix of said Carl D. Peterson, deceased, assignors to Dana Corporation, Toledo, Ohio, a corporation of Virginia Application January 11, 1946, Serial No. 640,473

7 Claims. (Cl. 192—68)

This invention relates to friction clutches which include driving and driven elements, one of which, usually the driving element, includes a pressure ring for coacting with the driven element, throw-out mechanism including radially-extending levers slidably fulcrumed at their outer ends and connected at their inner ends to the throw-out collar and operable to disengage the clutch against a spring force engaging the clutch; and has for its object a clutch spring arrangement for pressing and holding the clutch engaged, which spring is a flat ring arranged at an angle approximating a right angle to the axis of the clutch and dished to load and bias it to press the pressure ring into engaged position, and clutch levers operable to evenly warp or flex the spring from its dished or flat conoidal form into a plane, and hence disengage the clutch upon operation of the throw-out levers. It further has for its object such a clutch spring so constructed that the spring gradually unloads instead of increasing in strength during the throwing out operation, so that the effort of throwing out the clutch, whether by a pedal or by power, also decreases during the throwing out operation of the clutch.

The invention further has for its object a simple, compact construction and arrangement of the clutch levers and holding means therefor by which the levers are held from circumferential shifting and displacement where the levers are floating sectors of a disk, and abut against each other at their side edges, or at least at the side edges at their outer ends, which means includes a flat or washerlike spring held in the back plate and biased to press the outer ends of the levers toward the pressure ring, and thus hold the levers from being dislodged from each other at their side edges. It also has for its object such a construction where the spring also serves as a clutch spring to engage the clutch or the clutch spring serves to hold the floating levers from displacement.

Other objects with respect to certain features of construction will appear throughout the specification.

The invention consists in the novel features and in the combinations and constructions hereinafter set forth and claimed.

In describing this invention, reference is had to the accompanying drawings, in which like characters designate corresponding parts in all the views.

Figure 1 is a rear elevation of a clutch embodying this invention.

Figure 2 is a sectional view taken on the plane of line 2—2, Figure 1.

Figure 3 is a fragmentary sectional view illustrating a modified arrangement of the spring and levers relatively to each other.

The clutch here illustrated includes driving and driven elements 1, 2, the driving element including a cover or back plate 3 or what corresponds to a back plate in this general type of clutch, secured to a body as a flywheel 1A, and also an axially shiftable pressure ring 4 interlocked, as at 4A, in any well known manner with the back plate to rotate as a unit therewith. The driven plate is here shown as a plate having friction element disks 5 on opposite sides thereof, the plate extending between the pressure ring 4 and a friction face 6 on the body or flywheel 1A. The driven element 2 has a hub 7 slidably splined in a well known manner on the clutch shaft not shown.

8 designates the throw-out collar or sleeve, which is shiftable axially of the clutch shaft (not shown), this including an antifriction bearing 9 between the sleeve and a second sleeve or collar 10, which rotates with a driving member and to which the inner ends of the clutch levers are articulated in order to be operated thereby.

11 designates the clutch levers, these extending radially and being interlocked and articulated at their inner ends at 12, with the sleeve or collar 10 and slidably fulcrumed at their outer ends at 13 to the back plate, and also pressing against the spring to be described, somewhere near their outer ends to unload the spring, when the throw-out collar or sleeve 8 is operated. 14 designates the spring, this being a resilient platelike ring or spring washer arranged at an angle approximating a right angle to the axis of the clutch, or arranged edgewise relatively to the axis of the clutch, the spring being a dished disk sprung slightly out of a plane into conoidal form of low altitude so that it is slightly conoidal relative to the base line of the cone, and biased to press toward the apex of the cone formation. The spring 14 is anchored at 15 at its outer edge to the back plate or equivalent structure by being set in a groove therein and at its inner edge presses toward the pressure ring 4 to engage the clutch. In the form shown in Figures 1 and 2, the force of the spring is transferred to the pressure ring through the interposed levers 11 but the levers merely idle during the engaging of the clutch. In Figure 3, the spring 140 is shown as pressing directly against the pressure ring. The spring 14 (140) coacts with the levers which are sectors of a disk, at their outer ends, and hence prevents the levers from becoming displaced relatively to each other and sliding over each other in a circumferential direction, or getting out of radial alinement. Preferably, the sectors at their intermediate side edges rather than at margins of the outer ends are cut away to provide ventilating openings at 16 between the levers. The levers are also resiliently flexible.

In the form shown in Figures 1 and 2, springs 17 are provided for retracting or pulling out the pressure ring, when the throw-out collar is operated to release the clutch. As here shown, this clutch is of the pull-out type where the clutch collar is pulled out to release the clutch instead of being pushed in to release the clutch. The springs 17 are shown as in the general form of a yoke mounted between their ends between the heads 18 on studs or screws 19 anchored in the pressure ring and the ends of sleeves 20 around the studs and thrusting against the pressure ring. The ends of the yoke springs 17 press against clutch spring 14. Thus, when the levers 11 are operated to throw out the clutch, they also release the clutch spring 14 and the clutch spring 14 acting through the yoke springs 17, withdraws the pressure ring 4 from the driven member 2.

The spring 14 in the form shown in Figure 2 presses flatwise on the levers 11 and hold the levers from dislodgment relatively to each other. In the form shown in Figure 3, the clutch spring 140, as before stated, is interposed between the levers 110 and the pressure ring and the levers 110 interlock with the spring, in order to release the same, when the throw-out collar is operated, as by hooks or lugs 21 struck therefrom and arranged to hook around the inner edge of the spring 140, so that when the throw-out collar is operated, the clutch spring 140 is unloaded or moved from its slightly conical formation toward the plane of its base or through said plane. In this arrangement, the spring 140 holds the sector shaped levers from displacement.

In Figure 2, the outer ends of the levers 11 and the circumferential edge of the annular spring seat in an internal groove or grooves in the back plate, and hence this construction in connection with the annular plate spring 14 overlying the side abutting end areas of the sector shaped levers, facilitates the holding of the levers from circumferential displacement or shifting out of side abutting relation. In Figure 3, the end areas of the levers 110 and the outer circumferential margin of the spring 140 are also seated in an internal groove in the back plate, and this together with the fact that the levers overlie the annular plate clutch spring 140 and hook or interlock with the spring 140 prevents the circumferential displacement of the side abutting edges of the sector shaped levers.

The radial arrangement of the levers 11 is such that when the clutch is engaged, the levers pass to that side of the fulcrum plane of the levers that the centrifugal force of the levers acts with the spring 14 instead of in opposition thereto, so that the action of the centrifugal force on the levers does not tend to throw out the clutch. In the illustrated embodiment of this clutch, the greater portion of the levers extend forward of such fulcrum plane. In this clutch, because of the large diameter of the annular clutch spring and the segmental levers arranged side by side, uniform pressure is provided on the pressure ring, and also during the disengagement of the levers, the throw-out pressure is applied evenly to the flat clutch spring 14 or 140, thus eliminating high-stress concentration on the flat spring. The levers being resilient provide a smooth engagement of the clutch eliminating any necessity for a cushioned disk assembly. The flat or slightly conical annular clutch spring results in an especially compact design so that a minimum axial length only is required for installation in the vehicle or in any other confined space. Because of the use of this flat or slightly conical clutch spring, maximum load is obtained on the friction surfaces of the clutch when the clutch is in engaged position and also the load decreases as the throw-out levers are operated to disengage the clutch. This is highly desirable both in manual and automatic transmissions, as the load required at the throw-out bearing to hold the clutch in released position is greatly reduced. In the conventional clutch, the load increases as the clutch is disengaged against the spring holding it engaged.

What we claim is:

1. In a friction clutch of the type including a pressure ring, a back plate, a throw-out collar, and radially extending levers coacting with the throw-out collar and the back plate, and operable to transfer the movement of the throw-out collar to release the pressure ring and disengage the clutch; the combination of an annular plate clutch spring anchored at its outer edge to the back plate and biased to normally thrust its inner edge toward the pressure ring to transfer its pressure to the pressure ring to engage the clutch, said annular plate spring being normally slightly conical, loaded and biased to thrust its inner apex edge toward the pressure ring and distortable from conical form during the throwing out operation, and said levers being located to engage the spring and apply the distorting action to the spring during the throwing out operation.

2. In a friction clutch of the type including a pressure ring, a back plate, a throw-out collar and radially extending levers coacting with the throw-out collar and the back plate operable to transfer the throw-out movement of the collar to release the pressure on the pressure ring, said levers being in the general form of sectors fulcrumed at their outer ends to the back plate and abutting at their side edges against each other at least at the outer ends of the levers, and means to engage the clutch and to hold the levers from displacement including an annular dished plate spring anchored at its outer edge on the back plate and being biased to press against the outer end areas of the sector shaped levers.

3. In a friction clutch of the type including a pressure ring, a back plate, a throw-out collar and radially extending levers coacting with the throw-out collar and the back plate operable to transfer the throw-out movement of the collar to release the pressure on the pressure ring, said levers being in the general form of sectors fulcrumed at their outer ends to the back plate and abutting at their side edges against each other at least at the outer ends of the levers, and means to engage the clutch and for holding the levers from displacement including an annular dished plate spring anchored at its outer edge on the back plate and being biased to press against the outer end areas of the sector shaped levers, the levers coacting with said spring to release the same upon throw-out movement of the collar.

4. In a friction clutch of the type including a pressure ring, a back plate, a throw-out collar, a clutch spring and radially extending levers coacting with the throw-out collar and the back plate and operable to transfer the movement of the throw-out collar to release the pressure ring of the clutch spring; the combination of said levers being sectors of a disk and engaging at their side edges with each other and pressing against the back plate at their outer ends and against the pressure ring short of their outer ends, said clutch spring being an annular plate anchored to the back plate and biased to normally thrust against outer ends of the levers, said levers being interposed between the spring and the pressure ring.

5. In a friction clutch of the type including a pressure ring, a back plate, a throw-out collar, a clutch spring and radially extending levers coacting with the throw-out collar and the back plate and operable to transfer the movement of the throw-out collar to release the pressure ring of the clutch spring; the combination of said levers being sectors of a disk and engaging at their side edges with each other and pressing against the back plate at their outer ends, said clutch spring being an annular plate anchored to the back plate and biased to normally thrust against the outer ends of the levers, said levers being interposed between the spring and the pressure ring, and pull-off means to retract the pressure ring operable by the throw-out operation of the levers.

6. In a friction clutch of the type including a pressure ring, a back plate, a throw-out collar, a clutch spring and radially extending levers coacting with the throw-out collar and the back plate and operable to transfer the movement of the throw-out collar to release the pressure ring of the clutch spring; the combination of said levers being sectors of a disk and engaging at their side edges with each other and pressing against the back plate at their outer ends, said clutch spring being an annular plate anchored to the back plate and biased to normally thrust against the outer ends of the levers, said levers being interposed between the spring and the pressure ring, and pull-off means to retract the pressure ring operable by the throw-out operation of the levers, the pull-off means including studs extending from the pressure plate through the levers, and pull-off springs mounted on the studs, the pull-off springs thrusting against the clutch spring and thereby causing the clutch spring to press evenly against the levers and also transfer the release action of the spring by the levers through the studs and the pressure ring.

7. In a friction clutch of the type including a pressure ring, a back plate, a clutch spring, a throw-out collar and radially extending levers coacting with the throw-out collar and the back plate and operable to transfer the movement of the throw-out collar to relieve the pressure ring of the pressure of the clutch spring; the combination of said clutch spring including an annular plate anchored at its outer circumferential edge to the back plate and being biased to normally thrust against the pressure ring, and said levers being fulcrumed at their outer end edges on the back plate, pressing against the outer side of said annular plate spring and having means interlocking with said annular spring on the inner opposite side thereof, whereby during the throwing out operation, the levers engage the annular spring and pull it away from the pressure ring.

CARL D. PETERSON.
ALBERT H. DEIMEL.

REFERENCES CITED

The following references are of record in the file of this patent:

UNITED STATES PATENTS

| Number | Name | Date |
| --- | --- | --- |
| 2,171,908 | Beringer | Sept. 5, 1939 |
| 2,219,139 | Nutt et al. | Oct. 22, 1940 |
| 2,277,221 | Gamble | Mar. 24, 1942 |